US012373186B2

(12) United States Patent
Zeng

(10) Patent No.: US 12,373,186 B2
(45) Date of Patent: Jul. 29, 2025

(54) ENHANCING FIRMWARE UPGRADES IN ELECTRONIC DEVICES INCLUDED IN A NETWORK

(71) Applicant: ARRIS Enterprises LLC, Suwanee, GA (US)

(72) Inventor: Ruilu Zeng, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 225 days.

(21) Appl. No.: 17/433,308

(22) PCT Filed: Sep. 18, 2020

(86) PCT No.: PCT/CN2020/116320
§ 371 (c)(1),
(2) Date: Aug. 24, 2021

(87) PCT Pub. No.: WO2022/056881
PCT Pub. Date: Mar. 24, 2022

(65) Prior Publication Data
US 2022/0308855 A1  Sep. 29, 2022

(51) Int. Cl.
G06F 8/65 (2018.01)
G06F 9/4401 (2018.01)
H04L 67/00 (2022.01)

(52) U.S. Cl.
CPC .............. G06F 8/65 (2013.01); G06F 9/4416 (2013.01); H04L 67/34 (2013.01)

(58) Field of Classification Search
CPC . H04L 67/34; G06F 8/65; G06F 3/123; G06F 9/4416
See application file for complete search history.

(56) References Cited

U.S. PATENT DOCUMENTS 9,880,854 B1 * 1/2018 Myers ................... G06F 9/4401
2004/0040023 A1 * 2/2004 Ellis ........................ G06F 8/60
717/174

(Continued)

FOREIGN PATENT DOCUMENTS

CN  105022645  11/2015
CN  105339892  2/2016
CN  111124443  5/2020

OTHER PUBLICATIONS

International Search Report and the Written Opinion of the International Searching Authority dated May 27, 2021 in International (PCT) Application No. PCT/CN2020/116320.

Primary Examiner — S. Sough
Assistant Examiner — Cheneca Smith
(74) Attorney, Agent, or Firm — Wenderoth, Lind & Ponack, L.L.P.

(57) ABSTRACT

An electronic device included in a network capable of upgrading firmware via the network is provided that enhances stability of the network. The electronic device includes a network interface, a non-transitory memory having instructions stored thereon, and a hardware processor. The hardware processor is configured to execute the instructions to store a list of other electronic devices connected in the network. Moreover, the hardware processor is configured to execute the instructions to download a firmware upgrade to the electronic device and determine whether a reboot setting of the electronic device is enabled or disabled. When enabled, it is determined whether an active download session is being conducted by any of the other electronic devices and rebooting the electronic device is delayed when an active download session is detected; otherwise, the electronic device is rebooted to implement the firmware upgrade without a delay.

20 Claims, 4 Drawing Sheets

(56) References Cited

U.S. PATENT DOCUMENTS

| | | | | |
|---|---|---|---|---|
| 2008/0263347 | A1* | 10/2008 | Chen | G06F 9/4416 |
| | | | | 713/2 |
| 2012/0117557 | A1 | 5/2012 | Li | |
| 2013/0074061 | A1* | 3/2013 | Averbuch | G06F 8/654 |
| | | | | 717/171 |
| 2013/0136131 | A1* | 5/2013 | Hirai | H04L 12/12 |
| | | | | 370/392 |
| 2013/0298253 | A1* | 11/2013 | Hwang | H04L 63/10 |
| | | | | 726/26 |
| 2014/0006402 | A1* | 1/2014 | Lee | H04L 67/1063 |
| | | | | 707/E17.046 |
| 2014/0321855 | A1* | 10/2014 | Nors | H04Q 11/0067 |
| | | | | 398/66 |
| 2014/0380294 | A1* | 12/2014 | Wu | G06F 9/44505 |
| | | | | 717/170 |
| 2018/0285087 | A1* | 10/2018 | Lusk | H04L 41/082 |

\* cited by examiner

| EXTENDER TABLE ⟋25 | | | |
|---|---|---|---|
| 26 EXTENDER | 27 IP ADDRESS | 28 UPGRADE SERVER URL | 29 PORT NUMBER |
| EXTENDER 1 | 192.168.1.10 | WWW.UPGR1.COM | 80 |
| EXTENDER 2 | 192.168.1.12 | WWW.UPGR2.COM | 80 |
| EXTENDER 3 | 192.168.1.13 | WWW.UPGR3.COM | 443 |
| EXTENDER 4 | 192.168.1.14 | WWW.UPGR4.COM | 443 |
| | | | |
| | | | |

*FIG. 3*

| GATEWAY DEVICE REBOOT SETTING ⟋30 | | |
|---|---|---|
| | ENABLED | DISABLED |
| REBOOT | X | |

*FIG. 4*

ENHANCING FIRMWARE UPGRADES IN ELECTRONIC DEVICES INCLUDED IN A NETWORK

TECHNICAL FIELD

The subject matter of the present disclosure relates generally to providing a stable network by enhancing firmware upgrades in electronic devices included in the network.

BACKGROUND

Home networks typically include a gateway device and extenders as well as other devices. The gateway device and extenders should operate using combinations of firmware that comply with well-known standards, for example, ISO 9000 in order to provide a stable network. Firmware is computer software that provides low-level control for the hardware of a device.

Occasionally, firmware in the gateway device and the extenders needs to be upgraded. Firmware upgrades may be implemented sequentially or simultaneously and include downloading the firmware to the gateway device and the extenders. When implemented sequentially, the upgrades may be implemented in any order. For example, the firmware may be upgraded in the gateway device first then in the extenders, or in the extenders first then in the gateway device. However, typically the extenders download the firmware upgrade through the gateway device.

When implemented simultaneously, the firmware is downloaded to the gateway device and the extenders at roughly the same time. However, the download speed for the gateway device may be faster than for the extenders. As a result, the gateway device may complete downloading the firmware upgrade and automatically reboot before one or more of the extenders completes downloading the firmware upgrade. Under these conditions, the firmware upgrade for the extenders can be interrupted and in some cases fail unless the extenders implement a firmware upgrade retry mechanism or the gateway device retriggers an extender firmware upgrade. If the firmware upgrade for the extenders fails, the user may be required to manually retrigger the firmware upgrade for the extenders which is time consuming and inconvenient. Therefore, known techniques for upgrading firmware in different devices included in a network have drawbacks.

Thus, it would be advantageous and an improvement over the relevant technology to provide an apparatus, method, and computer-readable recording medium capable of upgrading firmware in different devices included in a network without interruption or failure.

SUMMARY

An aspect of the present disclosure provides an electronic device included in a network capable of upgrading firmware via the network for enhancing stability of the network. The electronic device includes a network interface, a non-transitory memory having instructions stored thereon, and a hardware processor.

The hardware processor is configured to execute the instructions to store in the non-transitory memory a list of other electronic devices connected in the network. The list includes an Internet Protocol (IP) address, an upgrade server Uniform Resource Locator (URL), and a port number for each other electronic device in the list. Moreover, the hardware processor is configured to execute the instructions to download a firmware upgrade to the non-transitory memory of the electronic device, and determine whether a reboot setting of the electronic device is enabled or disabled;

In response to determining the reboot setting is enabled, the hardware processor is configured to execute the instructions to determine whether an active download session is being conducted by any of the other electronic devices on the list and delay reboot of the electronic device when an active download session is detected. In response to determining the reboot setting is disabled, the hardware processor is configured to execute the instructions to reboot the electronic device to implement the firmware upgrade without a delay.

An aspect of the present disclosure provides a method for upgrading firmware in electronic devices included in a network. The method includes storing, using a memory of a first electronic device, a list of second electronic devices connected in the network. The list includes an Internet Protocol (IP) address, an upgrade server Uniform Resource Locator (URL), and a port number for each second electronic device in the list. Moreover, the method includes downloading a firmware upgrade to the memory of the first electronic device and determining whether a reboot setting of the first electronic device is enabled or disabled.

In response to determining the reboot setting is enabled, determining whether an active download session is being conducted by any of the second electronic devices on the list and delaying reboot of the first electronic device when an active download session is detected. In response to determining the reboot setting is disabled, rebooting the first electronic device to implement the firmware upgrade without a delay.

An aspect of the present disclosure provides a non-transitory computer-readable recording medium in an electronic device capable of upgrading firmware via a network for enhancing stability of the network. The non-transitory computer-readable recording medium stores instructions which when executed by a hardware processor performs the steps of the method described above.

BRIEF DESCRIPTION OF THE DRAWINGS

In the drawings, like reference numbers generally indicate identical, functionally similar, and/or structurally similar elements.

FIG. 3 is an exemplary table according to an embodiment of the present disclosure;

FIG. 4 is an exemplary table illustrating a status of a gateway device reboot setting.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
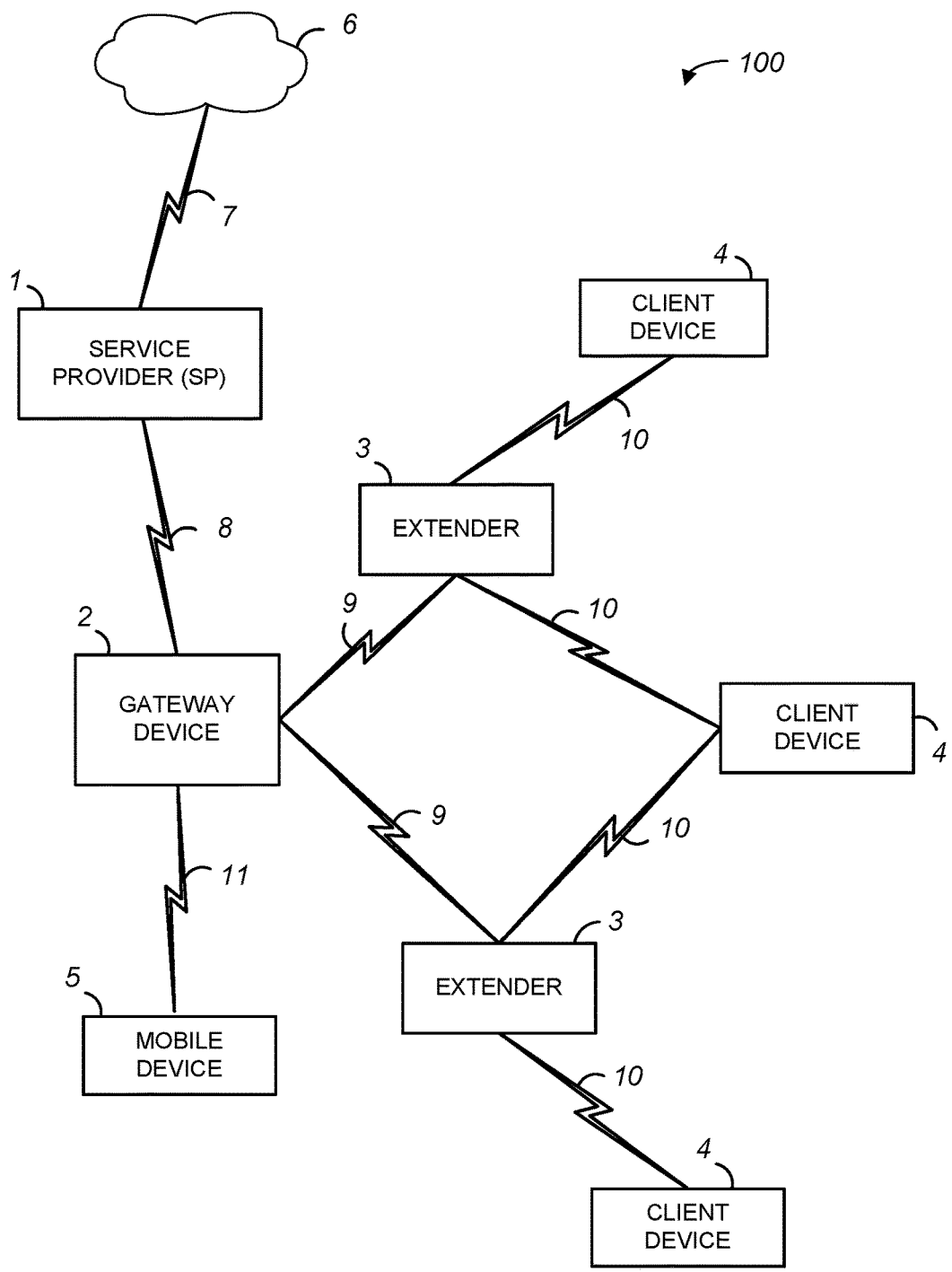
FIG. 1 is a schematic diagram illustrating an exemplary system for upgrading firmware in electronic devices.

FIG. 1 is a schematic diagram of an exemplary system 100 for upgrading firmware in electronic devices. As shown in FIG. 1, the main elements of the system 100 include a gateway device 2 connected to the Internet 6 via a Service Provider (SP) 1 and also connected to different wireless devices such as Wi-Fi extenders 3, client devices 4, and a mobile device 5.

The system 100 shown in FIG. 1 includes wireless devices (e.g., extenders 3, client devices 4, and mobile device 5) that may be connected in one or more wireless networks (e.g., private, guest, iControl, backhaul network, or Internet of things (IoT) networks) within the system 100. Additionally, there could be some overlap between devices in the different networks. That is, one or more network devices could be located in more than one network. For example, wireless extenders 3 could be located both in a private network for providing content and information to a client device and also included in a backhaul network.

In FIG. 1, the SP 1 can be, for example, a streaming video provider or any computer for connecting the gateway device 2 to the Internet 6. The connection 7 between the Internet 6 and the SP 1 and the connection 8 between the SP 1 and the gateway device 2 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 8 can further include as some portion thereof a broadband mobile phone network connection, an optical network connection, or other similar connections. For example, the connection 8 can also be implemented using a fixed wireless connection that operates in accordance with, but is not limited to, 3rd Generation Partnership Project (3GPP) Long Term Evolution (LTE) or 5G protocols.

The gateway device 2 is a hardware electronic device that performs the function of a stand-alone cable modem or a combination modem and gateway device that combines the functions of a modem, access point, and/or a router for providing received content to network devices (e.g., client devices 4, wireless extenders 3 and mobile device 5) in the system 100. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The gateway device 2 is connected to the wireless extenders 3 via connection 9. The connection 9 between the gateway device 2 and the wireless extenders 3 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands.

Additionally, the connection 9 can be implemented using a wireless connection that operates in accordance with, but is not limited to, IEEE 802.11 protocol, RF4CE protocol, ZigBee protocol, Z-Wave protocol, or IEEE 802.15.4 protocol. It is also contemplated by the present disclosure that the connections 9 can include connections to a media over coax (MoCA) network. One or more of the connections 9 can also be a wired Ethernet connection.

The wireless extenders 3 can be, for example, hardware electronic devices such as access points used to extend the wireless network by receiving the signals transmitted by the gateway device 2 and rebroadcasting the signals to, for example, client devices 4, which may be out of range of the gateway device 2. The wireless extenders 3 can also receive signals from the client devices 4 and rebroadcast the signals to the gateway device 2 or other client devices 4.

The connection 10 between the wireless extenders 3 and the client devices 4 may be implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 10 may be implemented using a wireless connection that operates in accordance with, but is not limited to, RF4CE protocol, ZigBee protocol, Z-Wave protocol, or IEEE 802.15.4 protocol. Also, one or more of the connections 10 can also be a wired Ethernet connection.

The client devices 4 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the gateway device 2. Additionally, the client devices 4 can be a TV, an IP/QAM STB or an SMD that is capable of decoding audio/video content, and playing over OTT or MSO provided content received through the gateway device 2.

The connection 11 between the gateway device 2 and the mobile device 5 may be implemented through a wireless connection that operates in accordance with, but is not limited to, IEEE 802.11 protocol. The connection 11 may also be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as a CBRS band, 2.4 GHz bands, 5 GHz bands, 6 GHz bands, or 60 GHz bands. The connection 11 between the gateway device 2 and the mobile device 5 may be wired or wireless. Additionally, connection 11 can also be implemented through a WAN, a LAN, a VPN, MANs, WLANs, SANs, a DOCSIS network, a fiber optics network (such as FTTH, FTTX, or HFC), a PSDN, a global Telex network, or a 2G, 3G, 4G or 5G network, for example. The connection 11 can also be a wired Ethernet connection.

The mobile device 5 can be, for example, a hand-held computing device, a personal computer, a smartphone, an electronic tablet, an e-reader, a personal digital assistant (PDA), or a portable music player with smart capabilities that is capable of connecting to the Internet, cellular networks, and interconnect with other devices via Wi-Fi and Bluetooth protocols. The mobile device 5 may be used by an operator of the system 100 to manually implement a firmware upgrade to the gateway device 2 and the wireless extenders in the system 100.

Figure 2:
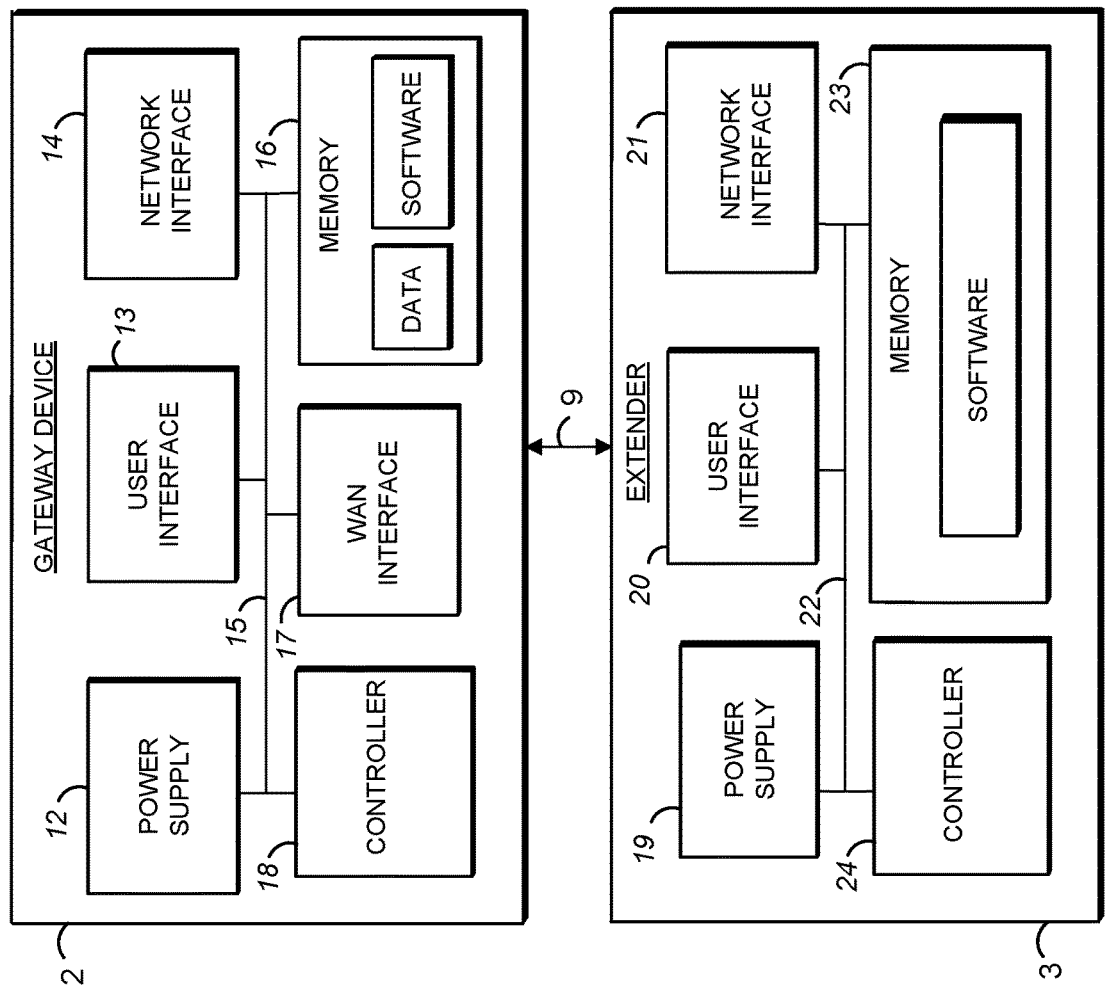
FIG. 2 is a more detailed schematic diagram illustrating an exemplary gateway device and an exemplary extender in the system of FIG. 1.

A detailed description of the example internal components of the gateway device 2 and the extenders 3 shown in FIG. 1 will be provided in the discussion of FIG. 2. However, in general, it is contemplated by the present disclosure that the gateway device 2 and the extenders 3 include electronic components or electronic computing devices operable to receive, transmit, process, store, and/or manage data and information associated with the system 100, which encompasses any suitable processing device adapted to perform computing tasks consistent with the execution of computer-readable instructions stored in a memory or a computer-readable recording medium.

Further, any, all, or some of the computing devices in the gateway device 2 and the extenders 3 may be adapted to execute any operating system, including Linux, UNIX, Windows, MacOS, DOS, and ChromeOS as well as virtual machines adapted to virtualize execution of a particular operating system, including customized and proprietary operating systems. The gateway device 2 and the extenders 3 are further equipped with components to facilitate communication with other computing devices over the one or more network connections to local and wide area networks, wireless and wired networks, public and private networks, and any other communication network enabling communication in the system 100.

The respective connections 7, 8 between the SP 1 and the Internet 6 and between the SP 1 and the gateway device 2 shown in FIG. 1 are meant to be exemplary connections and are not meant to indicate all possible connections between the SP 1, gateway devices 2, and the Internet 6. Additionally, the connections 9 between the gateway device 2 and the wireless extenders 3 shown in FIG. 1 are meant to be exemplary connections and are not meant to indicate all possible connections between the gateway devices 2 and the wireless extenders 3. Likewise, the connections 10 between the extenders 3 and the client devices 4 shown in FIG. 1 are meant to be exemplary connections and are not meant to indicate all possible connections between the wireless extenders 3 and client devices 4. Similarly, the connection 11 between the gateway device 2 and the mobile device 5 shown in FIG. 1 is meant to be an exemplary connection and not meant to indicate all possible connections between the gateway device 2 and the mobile device 5. Moreover, it is contemplated by the present disclosure that the number of SPs 1, gateway devices 2, wireless extenders 3, client devices 4, and mobile devices 5 is not limited to the number of SPs 1, gateway devices 2, wireless extenders 3, client devices 4, and mobile devices 5 shown in FIG. 1.

FIG. 2 illustrates a more detailed schematic diagram of an example gateway device 2 and an example extender 3 in the system 100 for upgrading firmware in electronic devices according to an embodiment of the present disclosure. Although FIG. 2 shows one extender 3, the extender 3 in the figure is meant to be representative of the other extender 3 shown in FIG. 1.

The gateway device 2 is a hardware electronic device that performs the function of a stand-alone cable modem or a combination modem and gateway device that combines the functions of a modem, access point and/or a router for providing received content to network devices (e.g., client devices 4, wireless extenders 3, and mobile device 5) in the system 100. It is also contemplated by the present disclosure that the gateway device 2 can include the function of, but is not limited to, an IP/QAM STB or SMD that is capable of decoding audio/video content, and playing OTT or MSO provided content. As shown in FIG. 2, the gateway device 2 includes a power supply 12, user interface 13, a network interface 14, a memory 16, a WAN interface 17 and a controller 18.

The power supply 12 supplies power to the internal components of the gateway device 2 through the internal bus 15. The power supply 12 can be a self-contained power source such as a battery pack with an interface to be powered through an electrical charger connected to an outlet (e.g., either directly or by way of another device).

The user interface 13 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the gateway device 2. The user interface 13 can also be implemented as a software HTTP/HTTPS graphical user interface (GUI) provided to technicians or end users.

The network interface 14 includes various network cards, and circuitry implemented in software and/or hardware to enable communications using the communication protocols of connections 9 and 11 (e.g., as previously described with reference to FIG. 1).

The memory 16 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy.

The memory 16 can be used to store any type of data, including, but not limited to, a reboot setting indicating the status of the gateway device 2 as enabled or disabled. The reboot setting may be included in a management information base (MIB) stored in the memory 16. Additionally, the memory 16 can be used to store data regarding firmware updates of the wireless extenders 3. Such data includes, but is not limited to, a name of each extender 3, an Internet Protocol (IP) address for each extender 3, a firmware upgrade server uniform resource locator (URL) for each extender 3, and a port number for each extender 3. The extender data may be assembled into a list and stored in any manner, for example, as a table.

The list may be created automatically or manually in advance of downloading a firmware upgrade, for example, during initial configuration of the system 100 and may be entered into the memory 16 in any manner. Alternatively, the list may be created in real-time as the result of messaging between the gateway device 2 and the wireless extenders 3. The list may be updated as extenders 3 are added or removed from the system 100, and may be reconfigured at any time for any reason.

The IP addresses may be obtained by the gateway device 2 from each respective extender 3 via Dynamic Host Configuration Protocol (DHCP), for example, when the respective extender 3 contacts the gateway device 2. Alternatively, the IP address for each extender 3 may be obtained from the gateway device 2 via DHCP. DHCP is a network management protocol used on Internet Protocol (IP) networks in which a DHCP server dynamically assigns an IP address and other network configuration parameters to each device on the network so the devices can communicate with other networks. The upgrade server URL and the port number for each extender 3, and perhaps information regarding additional parameters related to firmware upgrade, may be obtained from each respective extender 3.

Additionally, the memory 16 can be used to store any type of instructions and/or software, for example, firmware, simple network management protocol (SNMP) software or other software which enables the gateway device 2 to support the use of the same or similar protocol such as the SNMP protocol. The memory 16 may also store dynamic host configuration protocol (DHCP) software which enables the gateway device 2 to support the use of the same or similar protocols such as DHCP. Moreover, the memory 16 can be used to store any type of instructions and/or software associated with algorithms, processes, or operations for controlling the general functions and operations of the gateway device 2.

The WAN interface 17 may include various network cards and circuitry implemented in software and/or hardware to enable communications between the gateway device 2 and the Internet 6 via the SP 1 using communications protocols in accordance with connection 7 and 8 (e.g., as previously described with reference to FIG. 1).

The controller 18 controls the general operations of the gateway device 2 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 2. Communication between the components (e.g., 12-14 and 16-18) of the gateway device 2 is established using the internal bus 15.

The wireless extender 3 can be, for example, a hardware electronic device such as an access point used to extend the wireless network by receiving the signals transmitted by the gateway device 2 and rebroadcasting the signals to, for example, client devices 4, which may be out of range of the gateway device 2. The wireless extender 3 can also receive signals from the client devices 4 and rebroadcast the signals to the gateway device 2 or other client devices 4. As shown in FIG. 2, the extender 3 includes a power supply 19, user interface 20, network interface 21, a memory 23, and a controller 24.

The power supply 19 supplies power to the internal components of the extender 3 through an internal bus 22. The power supply 19 can be a self-contained power source such as a battery pack with an interface to be powered through an electrical charger connected to an outlet (e.g., either directly or by way of another device). The power supply 19 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 20 includes, but is not limited to, push buttons, a keyboard, a keypad, a LCD, a TFT, a LED, a HD or other similar display device including a display device having touch screen capabilities so as to allow interaction between a user and the extender 3. The user interface 13 can also be implemented as a software HTTP/HTTPS graphical user interface (GUI) provided to technicians or end users.

The network interface 21 includes various network cards, interfaces, and circuitry implemented in software and/or hardware to enable communications using the wireless protocols of connections 9 and 10 (e.g., as previously described with reference to FIG. 1).

The memory 23 includes a single memory or one or more memories or memory locations that include, but are not limited to, a RAM, a DRAM a memory buffer, a hard drive, a database, an EPROM, an EEPROM, a ROM, a flash memory, logic blocks of a FPGA, a hard disk or any other various layers of memory hierarchy. The memory 23 can be used to store any type of data including, but not limited to, the firmware upgrade server uniform resource locator (URL), port number, wireless network name, and password.

Additionally, the memory may store any type of instructions and/or software, for example, firmware and DHCP software which enable the extender 3 to support the use of the same or similar protocols such as DHCP. The memory 23 may also store simple network management protocol (SNMP) software or other software which enables the extender 3 to support the use of the same or similar protocol such as the SNMP protocol. The memory 23 may also be used to store any type of instructions and/or software associated with algorithms, processes, or operations for controlling the general functions and operations of the extender 3.

The controller 24 controls the general operations of the extender 3 and includes, but is not limited to, a CPU, a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the extender 3. Communication between the components (e.g., 19-21, 23 and 24) of the extender 3 is established using the internal bus 22.

Occasionally, the firmware in the gateway device 2 and the extender 3 should be upgraded. Firmware upgrades may be implemented in the gateway device 2 and the extender 3 sequentially or simultaneously. The download speed for the gateway device 2 may be faster than for the extender 3. As a result, when implementing the firmware simultaneously the gateway device 2 may complete downloading the firmware upgrade and automatically start rebooting before the extender 3 completes downloading the firmware upgrade.

Because the extender 3 downloads the firmware upgrade via the WAN interface 17 of the gateway device 2, the firmware upgrade for the extender 3 is interrupted when the gateway device 2 starts rebooting. As a result, the firmware upgrade for the extender 3 fails unless the extender 3 implements a firmware upgrade retry mechanism or the gateway device 2 retriggers an extender firmware upgrade. When neither of these occur the extender firmware upgrade fails. Consequently, a user or administrator of the system 100 is required to manually retrigger an extender firmware upgrade which is time consuming and inconvenient.

To address this problem, a list of extenders 3 is created that includes each extender 3 in the system 100. The list may be included in a table in which each extender 3 is associated with a corresponding Internet Protocol (IP) address, an upgrade server uniform resource locator (URL) address, and a port number. After the gateway device 2 completes downloading the firmware upgrade, instead of immediately automatically rebooting the gateway device 2 determines whether its reboot setting is enabled and if so determines whether an active download session is being conducted by one or more of the extenders 3 in the system 100. If an active download session is being conducted, the gateway device 2 delays rebooting until receiving a message from each extender 3 conducting an active download session that the download session is complete. Alternatively, the gateway device 2 may delay rebooting by a predetermined period of time after detecting the active download session. As a result, the network is more stable and user frustration and inconvenience caused by improper firmware upgrades in the system 100 are facilitated to be reduced.

FIG. 3 is an exemplary table 25 according to an embodiment of the present disclosure. The table 25 may be stored in the memory 16 of the gateway device 2. The table 25 includes a list 26 of extenders included in the system 100. More specifically, the list 26 includes, but is not limited to, extender 1, extender 2, extender 3, and extender 4. Although four extenders are included in the list 26, it is contemplated by the present disclosure that any number of extenders may be included in the list 26. However, the number of extenders in the list 26 should match the number of extenders in the system 100.

The list 26 may be created automatically or manually in advance of downloading a firmware upgrade, for example, during initial configuration of the system 100. Alternatively, the list 26 may be created in real-time as the result of messaging between the gateway device 2 and the wireless extenders in the list. The list 26 may be updated as extenders are added or removed from the system 100 and may be reconfigured at any time for any reason.

Each extender is associated with a corresponding Internet Protocol (IP) address 27. For example, extender 1 is associated with IP address 192.168.1.10, extender 2 is associated with IP address 192.168.1.12, extender 3 is associated with IP address 192.168.1.13, and extender 4 is associated with IP address 192.168.1.14. An IP address is a numerical label assigned to each device connected to a computer network that uses the Internet Protocol for communication. An IP address serves two main functions: host or network interface identification and location addressing. The IP addresses may be obtained by the gateway device 2 from each respective extender 3 via Dynamic Host Configuration Protocol (DHCP), for example, during messaging related to a firmware upgrade. However, if the IP address for each extender 4 is obtained from the gateway device 2 via DHCP, the extenders 4 generally belong to the same IP subnetwork and have similar IP addresses. The IP address of each extender 4 is the same except the last digit is different. As a result, it can be seen that the IP address for each extender 4 is obtained from the gateway device 2.

As described herein, each extender in the list 26 is also associated with an upgrade server uniform resource locator (URL) 28. For example, the upgrade server URL 28 for extender 1 is www.upgr1.com, the upgrade server URL for extender 2 is www.upgr2.com, the upgrade server URL for extender 3 is www.upgr3.com, and the upgrade server URL for extender 4 is www.upgr1.com. A URL, also known as a web address, is a reference to a web resource that specifies the location of the resource on a computer network and a mechanism for retrieving the resource. Although the upgrade server URL 28 for each extender is different, it is contemplated by the present disclosure that some or all of the extenders may have the same upgrade server URL 28.

Each extender in the list 26 is also associated with a port number 29. For example, the port numbers for the extenders 1, 2, 3, and 4 are, respectively, 80, 80, 443, and 443. Port number 80 represents Hypertext Transfer Protocol (HTTP) used in the world-wide-web, and port number 443 represents HTTPS which is HTTP over transport layer security (TSL) or secure socket layer (SSL).

A port number is always associated with an IP address of a host and the type of transport protocol used for communication. It completes the destination or origination network address of a message. Specific port numbers are reserved to identify specific services so that an arriving packet can be easily forwarded to a running application. The most common transport protocols that use port numbers are the Transmission Control Protocol (TCP) and the User Datagram Protocol (UDP).

The upgrade server URL and the port number for each extender 3, and perhaps information regarding additional parameters related to firmware upgrade, may be obtained from each respective extender 3.

FIG. 4 is an exemplary table 30 according to an embodiment of the present disclosure. The table 30 may be stored in the memory 16 of the gateway device 2 and indicates a status of a reboot setting of the gateway device 2. The status may be enabled or disabled.

When indicated as enabled, after downloading a firmware upgrade the gateway device 2 determines whether its reboot setting is enabled and if so determines whether an active download session is being conducted by one or more of the extenders 3 in the system 100. If an active download session is being conducted, the gateway device 2 delays rebooting until receiving a message from each extender 3 conducting an active download session that the download session is complete. Alternatively, the gateway device 2 may delay rebooting by a predetermined period of time after detecting the active download session. The period of time may be any time, for example, five seconds that enables the extenders 3 to complete downloading the firmware before the gateway device 2 starts rebooting.

When the status is indicated as disabled, the gateway device 2 immediately reboots after completing download of the firmware.

Figure 5:
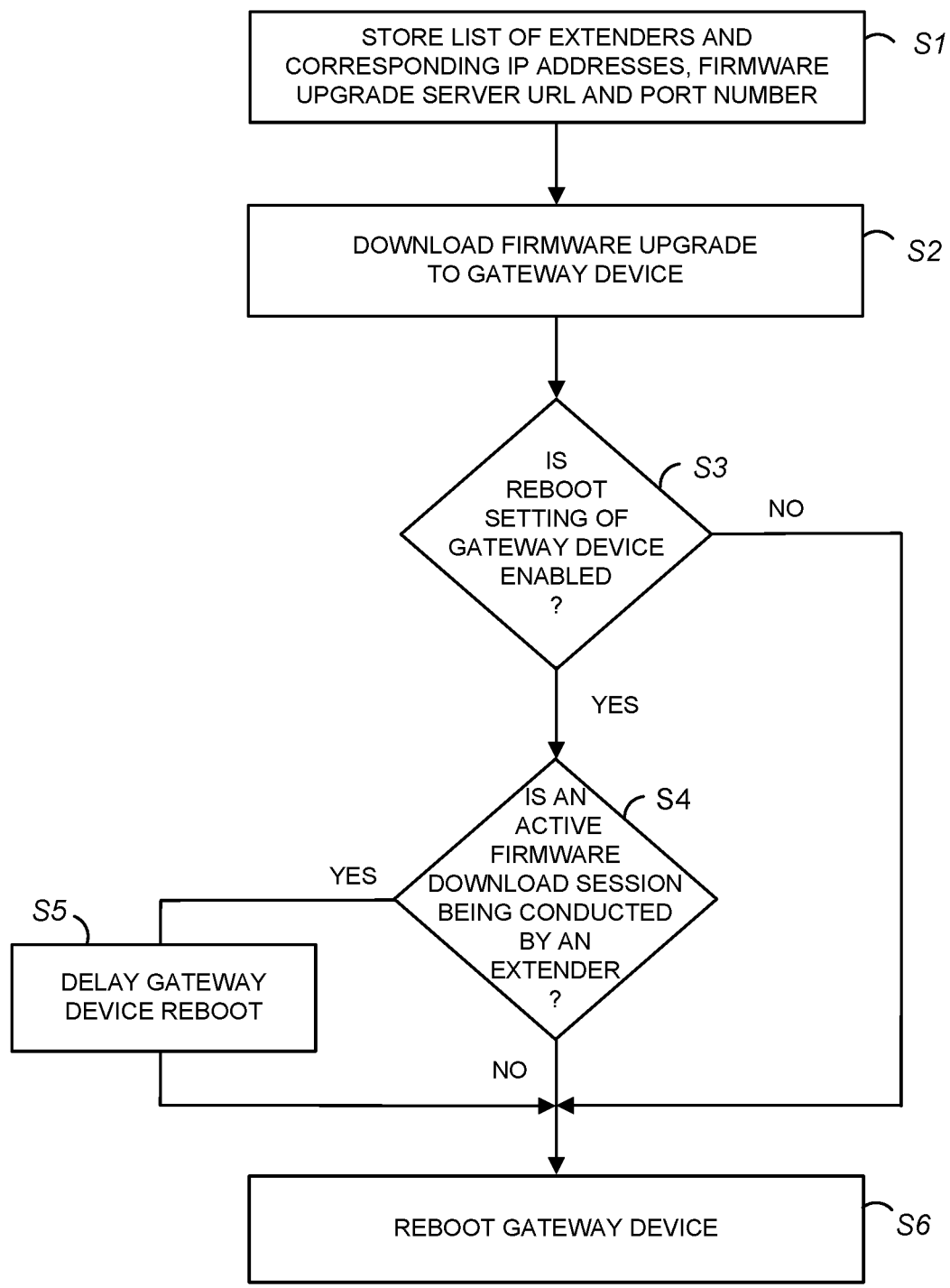
FIG. 5 is an exemplary method and algorithm for upgrading firmware in electronic devices according to an embodiment of the present disclosure.

FIG. 5 is an exemplary method and algorithm for upgrading firmware in electronic devices in the system 100 in accordance with an embodiment of the present disclosure. FIG. 5 illustrates exemplary operations performed before and after the gateway device 2 completes downloading a firmware upgrade. Additionally, the exemplary method and algorithm of FIG. 5 includes operations that are performed by the software executed by the controller 18 of the gateway device 2.

In step S1, the software executed by the controller 18 of the gateway device 2 causes the gateway device 2 to store a list of extenders in the memory 16. The list of extenders is included in a table. The list includes, but is not limited to, extender 1, extender 2, extender 3, and extender 4. Although four extenders are included in the table, it is contemplated by the present disclosure that any number of extenders may be included in the table. However, the number of extenders in the table should match the number of extenders in the system 100.

Each extender is associated with a corresponding Internet Protocol (IP) address. For example, extender 1 may be associated with IP address 192.168.1.10, extender 2 may be associated with IP address 192.168.1.12, extender 3 may be associated with IP address 192.168.1.13, and extender 4 may be associated with IP address 192.168.1.14. An IP address is a numerical label assigned to each device connected to a computer network that uses the Internet Protocol for communication. An IP address serves two main functions: host or network interface identification and location addressing. The IP addresses may be obtained by the gateway device 2 from each respective extender 3 via Dynamic Host Configuration Protocol (DHCP), for example, during messaging related to a firmware upgrade. However, if the IP address for each extender 4 is obtained from the gateway device 2 via DHCP, the extenders 4 generally belong to the same IP subnetwork and have similar IP addresses. The IP address of each extender 4 is the same except the last digit is different. As a result, it can be seen that the IP address for each extender 4 is obtained from the gateway device 2.

Each extender in the list is also associated with an upgrade server uniform resource locator (URL). For example, the upgrade server URL for extender 1 may be www.upgr1.com, the upgrade server URL for extender 2 may be www.upgr2.com, the upgrade server URL for extender 3 may be www.upgr3.com, and the upgrade server URL for extender 4 may be www.upgr1.com. A URL, also known as a web address, is a reference to a web resource that specifies the location of the resource on a computer network and a mechanism for retrieving the resource. Although the upgrade server URL for each extender is different, it is contemplated by the present disclosure that some or all of the extenders may have the same upgrade server URL.

Each extender in the list is also associated with a port number. For example, the port numbers for the extenders 1, 2, 3, and 4 may be, respectively, 80, 80, 443, and 443. Port number 80 represents Hypertext Transfer Protocol (HTTP) used in the world-wide-web, and port number 443 represents HTTPS which is HTTP over transport layer security (TSL) or secure socket layer (SSL). A port number is always associated with an IP address of a host and the type of transport protocol used for communication. It completes the destination or origination network address of a message.

The upgrade server URL and the port number for each extender, and perhaps information regarding additional parameters related to firmware upgrade, may be obtained by the gateway device 2 from each respective extender, for example, during messaging related to a firmware upgrade.

In step S2, the software executed by the controller 18 of the gateway device 2 causes the gateway device 2 to download a firmware upgrade and after completing the upgrade, in step S3, to determine if a reboot setting of the gateway device 2 is enabled. When the reboot setting is enabled, in step S4, the software executed by the controller 18 of the gateway device 2 causes the gateway device 2 to determine whether an active firmware download session is being conducted by the extender 3.

If an active download session is being conducted, in step S5, the gateway device 2 delays rebooting until receiving a message from the extender 3 that the download session is complete. After receiving the message, in step S6, the gateway device 2 reboots to complete the firmware upgrade. Delaying reboot facilitates preventing interruption and thus failure of the firmware upgrade for the extender 3. Alternatively, the gateway device 2 may delay rebooting by a predetermined period of time after detecting the active download session. The period of time may be any time, for example, five seconds that enables the extenders 3 to complete downloading the firmware upgrade before the gateway device 2 starts rebooting.

Otherwise, when the reboot setting is disabled, in step S6, the gateway device reboots to complete the firmware upgrade.

Using the methods and algorithms for upgrading firmware in electronic devices included in a system enhances the stability of the system and facilitates reducing the frustration and inconvenience suffered by users caused by automatic improper firmware upgrades and the resulting manual download and installation of firmware upgrades.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIG. 5. For example, the one or more memories stores software or algorithms with executable instructions and the one or more processors can execute a set of instructions of the software or algorithms in association with onboarding of wireless extenders in the wireless residential network.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

I claim:

1. A method for upgrading firmware in network equipment included in a network, the method comprising:
communicating from first network equipment to second network equipment connected in the network via a WAN interface;
creating, using a hardware processor, a list of the second network equipment based on the communicating with the second network equipment, wherein the list includes an Internet Protocol (IP) address, an upgrade server Uniform Resource Locator (URL), and a port number for each of the second network equipment;
storing, using a memory of the first network equipment, the list of second network equipment connected in the network;
downloading a firmware upgrade to the memory of the first network equipment via a network interface;
determining, using the hardware processor, whether a reboot setting of the first network equipment is enabled or disabled;
in response to determining the reboot setting is enabled, determining, using the hardware processor, whether an active download session is being conducted by any of the second network equipment on the list and controlling an operation of the network equipment of delaying of a reboot of the network equipment to implement the firmware upgrade when an active download session is detected, wherein the controlling of the operation of the network equipment to delay the reboot is maintained until it is determined that the active download session is completed; and
in response to determining the reboot setting is disabled, controlling, using the hardware processor, an operation of the network equipment of immediately rebooting of the first network equipment to implement the firmware upgrade without a delay.

2. The method according to claim 1, wherein the delaying of the reboot of the first network equipment when an active download session is detected comprises delaying the reboot of the first network equipment until the first network equipment receives a message that the detected download session is complete.

3. The method according to claim 1, wherein the delaying of the reboot of the first network equipment when an active download session is detected comprises delaying the reboot of the first network equipment by a predetermined period of time until no active download session is being conducted by any of the second network equipment on the list.

4. The method according to claim 3, wherein the first network equipment is a gateway device and each second network equipment is an extender.

5. The method according to claim 3, wherein the reboot setting is included in a management information base (MIB) included in the first network equipment.

6. The method according to claim 3, wherein the first network equipment is a gateway device and each second network equipment is a set-top-box (STB).

7. Network equipment included in a network capable of upgrading firmware via the network for enhancing stability of the network, the network equipment comprising:
a network interface;
a WAN interface;
a non-transitory memory having instructions stored thereon; and
a hardware processor configured to execute the instructions to:
communicate with other network equipment connected in the network via the WAN interface;
create, using the hardware processor, a list of the other network equipment based on the communicating with the other network equipment, wherein the list includes an Internet Protocol (IP) address, an upgrade server Uniform Resource Locator (URL), and a port number for each of the other network equipment;
store, in the non-transitory memory, the list of other network equipment connected in the network;
download a firmware upgrade to the non-transitory memory of the network equipment via the network interface;
determine, using the hardware processor, whether a reboot setting of the network equipment is enabled or disabled;
in response to determining the reboot setting is enabled, determine, using the hardware processor, whether an active download session is being conducted by any of the other network equipment on the list and control an operation of the network equipment to a delay of a reboot of the network equipment to implement the firmware upgrade when an active download session is detected, wherein the control of the operation of the network equipment to delay the reboot is maintained until it is determined that the active download session is completed; and
in response to determining the reboot setting is disabled, control, using the hardware processor, an operation of the network equipment to immediately reboot the network equipment to implement the firmware upgrade without a delay.

8. The network equipment according to claim 7, wherein the hardware processor further executes the instructions to delay the rebooting of the network equipment until the network interface receives a message indicating the detected download session is complete.

9. The network equipment according to claim 7, wherein the hardware processor further executes the instructions to delay the rebooting of the network equipment by a predetermined period of time until no active download session is being conducted by any of the other network equipment on the list.

10. The network equipment according to claim 7, wherein the network equipment is a gateway device and each of the other network equipment is an extender.

11. The network equipment according to claim 7, wherein the reboot setting is included in a management information base (MIB) stored in the non-transitory memory.

12. The network equipment according to claim 7, wherein the network equipment is a gateway device and each of the other network equipment is a set-top-box (STB).

13. The network equipment according to claim 7, wherein the list is created in real-time based on the communicating with the other network equipment connected in the network.

14. The network equipment according to claim 7, wherein the list is updated when the other network equipment are added or deleted from the network.

15. A non-transitory computer-readable recording medium for upgrading firmware in network equipment included in a network for enhancing stability of the network, the network communicatively connecting first network equipment and one or more second network equipment, the non-transitory computer-readable recording medium storing instructions which when executed by a hardware processor cause the non-transitory recording medium to perform steps comprising:

communicating from the first network equipment to the second network equipment connected in the network via a WAN interface;

creating, using a hardware processor, a list of the second network equipment based on the communicating with the second network equipment, wherein the list includes an Internet Protocol (IP) address, an upgrade server Uniform Resource Locator (URL), and a port number for each of the second network equipment;

storing, using a memory of the first network equipment, the list of second network equipment connected in the network;

downloading a firmware upgrade to the memory of the first network equipment via a network interface;

determining, using the hardware processor, whether a reboot setting of the first network equipment is enabled or disabled;

in response to determining the reboot setting is enabled, determining, using the hardware processor, whether an active download session is being conducted by any of the second network equipment on the list and controlling an operation of the network equipment of delaying of a reboot of the network equipment to implement the firmware upgrade when an active download session is detected, wherein the controlling of the operation of the network equipment to delay the reboot is maintained until it is determined that the active download session is completed; and in response to determining the reboot setting is disabled, controlling, using the hardware processor, an operation of the network equipment of immediately rebooting of the first network equipment to implement the firmware upgrade without a delay.

16. The non-transitory computer-readable recording medium according to claim 15, further comprising delaying of the reboot of the first network equipment until the first network equipment receives a message that the detected download session is complete.

17. The non-transitory computer-readable recording medium according to claim 15, further comprising delaying of the reboot of the first network equipment by a predetermined period of time until no active download session is being conducted by any of the second network equipment on the list.

18. The non-transitory computer-readable recording medium according to claim 15, wherein the first network equipment is a gateway device and each second network equipment is an extender.

19. The non-transitory computer-readable recording medium according to claim 15, wherein the reboot setting is included in a management information base (MIB) included in the first network equipment.

20. The non-transitory computer-readable recording medium according to claim 15, wherein the first network equipment is a gateway device and each second network equipment is a set-top-box (STB).

* * * * *